Figure 1:
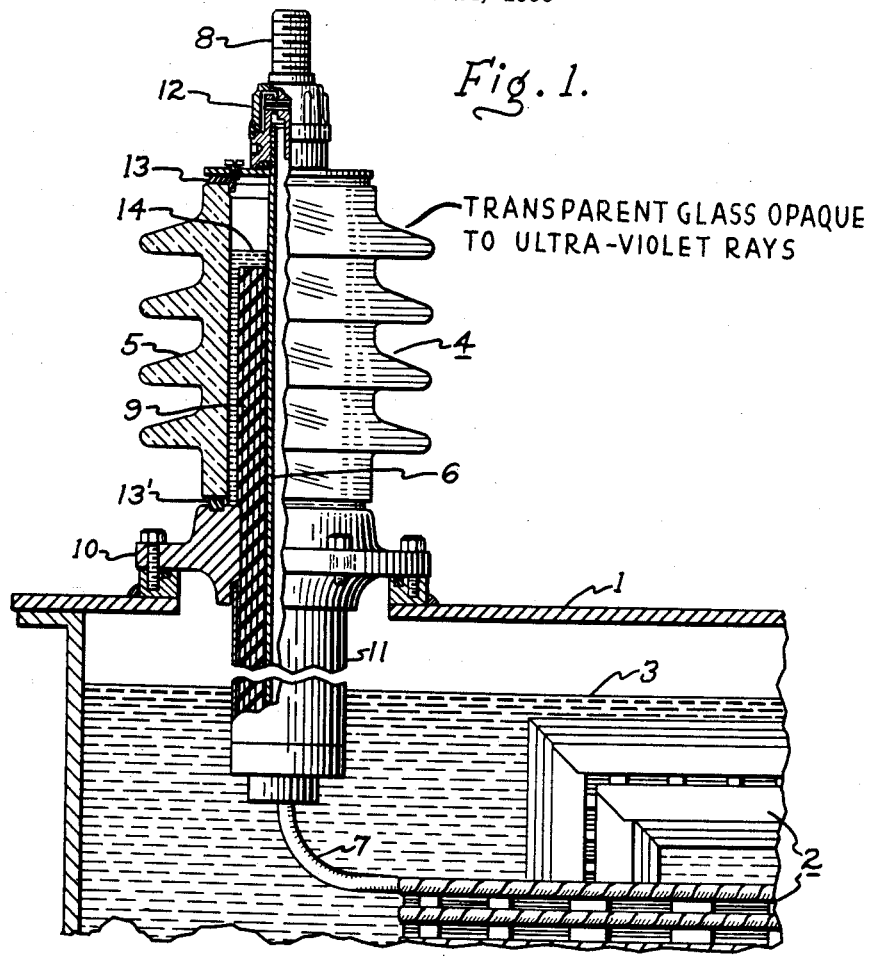

Inventors
Edward J. Broderick,
William J. Morrissey,
by Gilbert P. Tarleton
Their Attorney.

United States Patent Office 2,924,636
Patented Feb. 9, 1960

2,924,636

GLASS COMPONENT FOR ELECTRICAL APPARATUS

Edward J. Broderick and William J. Morrissey, Pittsfield, Mass., assignors to General Electric Company, a corporation of New York Application October 24, 1956, Serial No. 617,992

4 Claims. (Cl. 174—18)

The present invention relates to a glass component for electrical apparatus, and more particularly to an improved glass composition for making transparent bushing insulators adapted for use with electrical apparatus to protect insulating liquids in such apparatus from adverse effects of ultraviolet radiation.

Electrical apparatus for which the present bushing insulators are adapted include transformers, capacitors, switchgear and other apparatus which are encased in containers or tanks, the bushings normally being mounted on the container wall with a conducting lead passing from the enclosed electrical device through the bushing to the exterior of the casing.

Tinted glass bushings are already known which have been used to protect insulating liquids from exposure to harmful light rays in the shorter wave lengths, but the known bushings of this type either have a cut-off substantially below 400 millimicrons thus allowing transmission of the harmful rays which have wave lengths between the maximum cut-off of the bushing glass and 400 millimicrons, or they do not allow ready visual observation through the bushing.

Other disadvantages of known types of glass compositions which may otherwise be suitable in terms of light transmission properties are insufficiently low thermal expansion to withstand operational conditions of wide temperature variation, poor weather resistance, or unsatisfactory physical properties in the molten state, such as excessively high melting points or low softening points, which lead to difficulties in manufacturing the glass product and often entail greater production cost.

It is an object of the present invention to provide electrical apparatus of the above type having an improved glass component which allows ready visual inspection of the insulating liquid contained in the electrical apparatus while protecting the same from exposure to the harmful effects of light rays.

It is another object of the invention to provide a glass component such as bushing insulators of the above type and a highly weather resistant glass composition therefor which has the above desirable transmission properties and has low thermal expansion properties, coupled with relatively low melting range, such fluidity in the molten state as to allow centrifugal casting techniques, and high setting point as shown by the softening point temperature.

Other objects and advantages will become apparent from the following description and appended claims.

With the above objects in view, the present invention in one of its aspects comprises a light transmitting component for electrical apparatus incorporating insulating liquids subject to photodecomposition, the light transmitting component being opaque to light rays below 400 millimicrons wavelength, and being transparent to light rays in the visible range, the light transmitting component being formed of a glass composition having low thermal expansion and relatively low melting point and including about 0.75–4.0% by weight of cerium oxide and about 0.5–2.0% by weight of titanium dioxide. The base glass composition used in practicing the invention includes alumina, silica, boric oxide, magnesium oxide and calcium oxide in particular ranges as hereinafter more fully described, which in combination with the above light-selective materials produces a glass component having the improved characteristics described.

Figure 2:
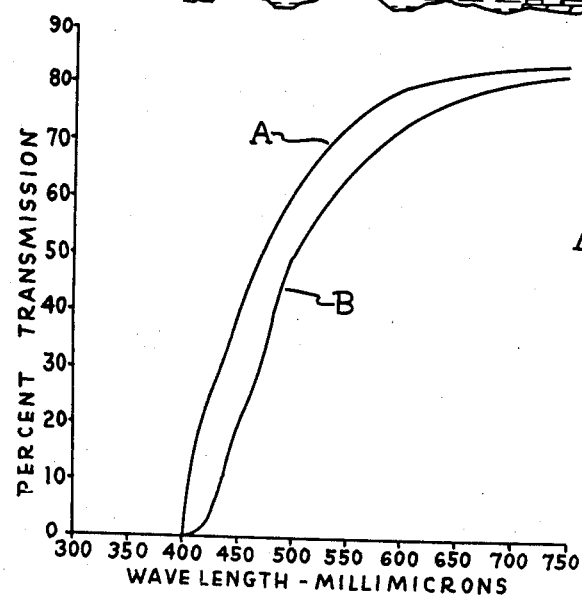

The invention will be better understood from the following description and accompanying drawing, in which:

Fig. 1 is a fragmentary view in elevation partly in section of a transformer having a transparent glass bushing in which the present invention may be embodied; and Fig. 2 is a graph showing transmission curves of two examples of the glass composition of the present invention.

Referring now to the drawing, and particularly to Fig. 1, there is shown a transformer tank 1 containing transformer elements comprising essentially a core and winding assembly 2 immersed in a cooling and insulating liquid 3. Mounted on the transformer cover is a bushing assembly 4 comprising a transparent glass shell 5 having the composition and properties more fully described below. Associated with glass shell 5 in the bushing assembly 4 is a central metallic tube 6 surrounded by an insulating cylinder 9 made of resin impregnated paper or the like which extends partially into glass shell 5. Intermediate the ends of bushing assembly 4 is a mounting flange 10 by means of which the assembly 4 is secured to the transformer cover. Tubular ground sleeve 11 secured at its upper end to mounting flange 10 and extending into the insulating liquid 3 in the tank is pressed over insulating cylinder 9 so as to form a liquid-tight joint therewith. Glass shell 5 is mounted on the bushing assembly with its lower end resting on support flange 10 with a gasket 13' therebetween, shell 5 being urged downwardly into firm engagement with the flange 10 by means of a clamping assembly 12 pressing on the top of shell 5 with a gasket 13 interposed therebetween. A conducting lead 7 passing through central metallic tube 6 is connected at one end to the transformer winding assembly 2 and at the other end to bushing terminal 8. The interior of glass shell 5 is partly filled with an insulating liquid 14 of known type, the insulating liquid impregnating the insulating cylinder 9 to provide an effective composite insulating barrier between conductive lead 7 and the grounded parts of the bushing and transformer tank. Escape of insulating liquid 14 through the bottom of the bushing assembly is prevented by virtue of the liquid-tight joint between ground sleeve 11 and insulating cylinder 9, as described above. As shown, sufficient insulating liquid 14 normally is introduced into the bushing assembly so that its level may be seen through glass shell 5 between the upper end of insulating cylinder 9 and the top of the glass shell.

Instead of the type of bushing with self-contained insulating liquid as shown, other known types of bushings may be used if desired. For example, the bushing may be of a known hollow type which is open at the bottom to the tank interior, so that the insulating liquid introduced into the tank may rise up into the bushing interior, with the level of the insulating liquid being observable through the transparent bushing glass.

In the gasket-sealed types of bushing insulators, such as illustrated, it is possible to employ a glass having low thermal expansion to improve its resistance to severe thermal changes. In view of the transparent nature of the glass for allowing observation of the oil level therein, the further problem of adverse effects of ultraviolet light on the insulating oil is especially important, particularly since transformers, capacitors, and other electrical apparatus incorporating such bushings are often exposed to direct or indirect sunlight. It has been found that light radiation in the ultraviolet range, especially light of wavelengths below 400 millimicrons, is particularly injurious to insulating liquids commonly used, such as mineral oil or chlorinated aromatic compounds of various compositions. The effect of these light rays is to cause chemical changes in the liquid which produce acid and sludge. These reduce the dielectric strength of the liquid, lower its resistivity, attack solid materials such as resin impregnants used as dielectric or insulating material in the apparatus, corrode metal parts, and considerably reduce the heat dissipating capabilities of the liquid.

It has been found in accordance with the invention that a bushing insulator having the following glass composition, with ranges of proportions given in percent by weight, will afford the above desirable combination of physical properties and light transmission characteristics:

Table I

| | Percent |
|---|---|
| Silica ($SiO_2$) | 38.5–55 |
| Alumina ($Al_2O_3$) | 15–25 |
| Calcia (CaO) | 8.5–17.5 |
| Magnesia (MgO) | 2.5–7.5 |
| Boric oxide ($B_2O_3$) | 12.5–25 |
| Sodium oxide ($Na_2O$) | 0–1.0 |
| Potassium oxide ($K_2O$) | 0–0.5 |
| Ceric oxide ($CeO_2$) | 0.75–4.0 |
| Titanium dioxide ($TiO_2$) | 0.5–2.0 |

More particularly, the glass has the following preferred range of composition within the above limits, in percent by weight:

Table II

| | Percent |
|---|---|
| Silica | 45–47.5 |
| Alumina | 19–20 |
| Calcia | 9.5–10 |
| Magnesia | 6.9–7.5 |
| Boric oxide | 14–15 |
| Sodium oxide | 0.25–0.55 |
| Potassium oxide | 0.25–0.55 |
| Ceric oxide | 1.5–4.0 |
| Titanium dioxide | 0.45–1.5 |

Typical compositions in the above ranges are set forth in percent by weight in the following table:

Table III

| | | A | B | C | D | E |
|---|---|---|---|---|---|---|
| Silica | percent | 46.7 | 46.0 | 41.0 | 36.5 | 47.5 |
| Alumina | do | 19.6 | 19.3 | 19.0 | 18.2 | 15.0 |
| Calcia | do | 9.5 | 9.4 | 10.0 | 15.8 | 12.0 |
| Magnesia | do | 6.9 | 6.8 | 7.5 | 2.5 | 2.5 |
| Boric Oxide | do | 14.8 | 14.5 | 19.5 | 23.0 | 18.0 |
| Sodium Oxide | do | 0.25 | 0.25 | 0.5 | | |
| Potassium Oxide | do | 0.25 | 0.25 | | | |
| Ceric Oxide | do | 1.5 | 2.5 | 2.0 | 3.0 | 3.5 |
| Titanium Dioxide | do | 0.5 | 1.0 | 0.5 | 1.0 | 1.5 |

The above glass compositions have shown excellent weather resistance and electrical insulation values, have relatively low expansion characteristics, and relatively high softening points. Glass compositions A and B, for example, have a coefficient of expansion of about $40 \times 10^{-7}$ cm./cm./° C., and glass C has a coefficient of expansion of about $42 \times 10^{-7}$ cm./cm./° C. Glasses A and B have a softening point of about 853° C., while glass C has a corresponding value of 828° C.

Fig. 2 is a graph showing light transmission curves representing the cut-off characteristics of two embodiments of the present glass composition. Curve A represents a glass 1 cm. thick having the composition set forth under glass A above, which includes 1.5% ceric oxide and 0.5% titanium dioxide. This glass gives optimum results in terms of maximum cut-off of ultraviolet rays with maximum transmission of the visible light range. Curve B represents a glass of 1 cm. thickness having the composition of glass B above, which is virtually the same as glass A except that 2.5% of ceric oxide and 1.0% of titanium dioxide were used. While the cut-off of ultraviolet radiation afforded by glass B begins at about 400 millimicrons as in the case of glass A, the percent transmission in the visible range of glass of curve B is somewhat less than that of the glass of curve A, and the cut-off at the ultraviolet region is not as sharp. Preferably, the proportion of ceric oxide and titanium dioxide are so chosen as to provide cut-off curves lying in the area bounded by curves A and B, although slight variations on either side of this area may be useful for special cases, as, for example, in the use of a glass affording less transmission of visible light than glass B where a high degree of visibility is not required.

While the ceric oxide and titanium dioxide components may vary within the ranges of proportions specified in Table I above, optimum results are obtained in accordance with the invention by using a preponderance of ceric oxide in relation to titanium dioxide and particularly in a ratio of about 3 to 1.

The glass produced in accordance with the invention thus provides a highly weather resistant, low expansion glass article which is characterized by high transparency in the visible range coupled with effective ultraviolet cut-off properties. The glass composition described can be melted at about 1200° C. and cast at slightly higher temperatures (1230–1280° C.), and being extremely fluid at these temperatures can be easily centrifugally cast. Because of its high setting (softening) point and low coefficient of expansion, the present glass material is particularly adapted to withstand the thermal shocks obtained in the chilled mold during casting. The high setting point allows early removal from the mold since all portions of the glass reach the solidification point sooner than in the case where a low setting point glass is used. Thermal gradients are thus reduced and less strain which may cause fracture is developed in the relatively large mass.

While various types of batch materials may be used to obtain the final glass composition of the present invention and will be apparent to those skilled in the art, the following composition in approximate parts by weight of batch materials is given as illustrative:

Table IV

| | Parts |
|---|---|
| Flint | 47.5 |
| Boric acid | 26.6 |
| Hydrated alumina | 29.1 |
| Hydrated dolomitic lime | 24.7 |
| Soda ash | 1.3 |
| Potassium nitrate | 1.1 |
| Ceric oxide | 1.9 |
| Titanium dioxide | 1.25 |

In a typical process of making the present glass composition, the raw batch ingredients are individually weighed and dry-mixed with 25 parts of cullet. The mixture is fed into an electric furnace wherein the mixed ingredients are melted at about 1250° C. and refined at a slightly higher temperature of 1300° C. The molten material at about 1200° C. is poured into a centrifugal casting mold, and after being formed in the mold the material is removed therefrom, annealed at 550–625° C. or tempered, after which the unit is allowed to cool and then assembled into a bushing.

While the present invention has been described with reference to particular embodiments of electrical apparatus and glass bushing, it will be understood that numerous modifications may be made by those skilled in the art without departing from the scope of the invention. Accordingly, the appended claims are intended to cover all such equivalent variations as come within the true spirit and scope of the invention.

What we claim as new and desire to secure by Letters Patent of the United States is:

1. Electrical apparatus comprising, in combination, a container; an electrical device in said container; a light transmitting component mounted on said container; and insulating fluid contained by said component, said component comprising a highly weather resistant, low thermal expansion glass providing for visual observation therethrough while blocking passage of light of wavelengths less than 400 millimicrons, said glass having the following range of composition in percent by weight:

| | Percent |
|---|---|
| Silica | 38.5–55 |
| Alumina | 15–25 |
| Calcia | 8.5–17.5 |
| Magnesia | 2.5–7.5 |
| Boric oxide | 12.5–25 |
| Sodium oxide | 0–1.0 |
| Pottassium oxide | 0–0.5 |
| Ceric oxide | 1.5–4.0 |
| Titanium dioxide | 0.5–2.0 | the ratio of ceric oxide to titanium dioxide being at least about 2 to 1.

2. Electrical apparatus comprising, in combination, a container; an electrical device in said container; a conductor connected to said contained electrical device and extending to the exterior of said container; insulating bushing means mounted on said container for insulating said conductor from said container; and an insulating liquid contained in and observable through said insulating bushing means and subject to deterioration by exposure to light rays of less than 400 millimicrons wavelength, said insulating bushing means comprising a highly weather resistant, low thermal expansion glass providing for visual observation therethrough while blocking passage of light of wavelengths less than 400 millimicrons, said glass having the following range of composition in percent by weight:

| | Percent |
|---|---|
| Silica | 45–47.5 |
| Alumina | 19–20 |
| Calcia | 9.5–10 |
| Magnesia | 6.9–7.5 |
| Boric oxide | 14–15 |
| Sodium oxide | 0.25–0.55 |
| Potassium oxide | 0.25–0.55 |
| Ceric oxide | 1.5–4.0 |
| Titanium dioxide | 0.45–1.5 | the ratio of ceric oxide to titanium dioxide being at least about 2 to 1.

3. A highly weather resistant, low thermal expansion glass opaque to light of wavelengths below 400 millimicrons and transparent to light rays in the visible range, said glass having the following range of composition in percent by weight:

| | Percent |
|---|---|
| Silica | 38.5–55 |
| Alumina | 15–25 |
| Calcia | 8.5–17.5 |
| Magnesia | 2.5–7.5 |
| Boric oxide | 12.5–25 |
| Sodium oxide | 0–1.0 |
| Potassium oxide | 0–0.5 |
| Ceric oxide | 1.5–4.0 |
| Titanium dioxide | 0.5–2.0 | the ratio of ceric oxide to titanium dioxide being at least about 2 to 1.

4. An insulating bushing for electrical apparatus comprising a hollow glass member adapted to contain an insulating liquid, and being characterized by high weather resistance and low thermal expansion properties while providing for visual observation therethrough and blocking passage of light of wavelengths less than 400 millimicrons, said glass having the following range of composition in percent by weight:

| | Percent |
|---|---|
| Silica | 45–47.5 |
| Alumina | 19–20 |
| Calcia | 9.5–10 |
| Magnesia | 6.9–7.5 |
| Boric oxide | 14–15 |
| Sodium oxide | 0.25–0.55 |
| Potassium oxide | 0.25–0.55 |
| Ceric oxide | 1.5–4.0 |
| Titanium dioxide | 0.5–1.5 | the ratio of ceric oxide to titanium dioxide being at least about 2 to 1.

References Cited in the file of this patent

UNITED STATES PATENTS

| | | |
|---|---|---|
| 1,292,147 | Taylor | Jan. 21, 1919 |
| 1,968,854 | Pirani et al. | Aug. 7, 1934 |
| 2,021,244 | Scott | Nov. 19, 1935 |
| 2,028,589 | Clark | Jan. 21, 1936 |
| 2,444,976 | Brown | July 13, 1948 |
| 2,683,666 | Duncan | July 13, 1954 |
| 2,739,901 | Herold et al. | Mar. 27, 1956 |
| 2,846,325 | Bennett et al. | Aug. 5, 1958 |
| 2,860,059 | Molter et al. | Nov. 11, 1958 |